United States Patent
Black et al.

(10) Patent No.: US 7,298,935 B1
(45) Date of Patent: Nov. 20, 2007

(54) WAVEGUIDE POLARIZATION BEAM SPLITTERS AND METHOD OF FABRICATING A WAVEGUIDE WIRE-GRID POLARIZATION BEAM SPLITTER

(75) Inventors: Charles T. Black, New York, NY (US);
Gian-Luca Bona, San Jose, CA (US);
Timothy J. Dalton, Ridgefield, CT (US); Nicholas C. M. Fuller, Ossining, NY (US); Roland Germann, Wangen (CH); Maurice McGlashan-Powell, Mount Vernon, NY (US);
Chandrasekhar Narayan, San Jose, CA (US); Robert L. Sandstrom, Chestnut Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/415,923

(22) Filed: May 1, 2006

(51) Int. Cl.
*G02B 6/00* (2006.01)
(52) U.S. Cl. .......................... 385/11; 359/486
(58) Field of Classification Search ............ 385/11, 385/14, 129–132; 359/486, 495
See application file for complete search history.

(56) References Cited

U.S. PATENT DOCUMENTS

| 6,775,427 B2 * | 8/2004 | Evans ..................... 385/14 |
| 6,844,971 B2 * | 1/2005 | Silverstein et al. ......... 359/486 |
| 6,876,784 B2 * | 4/2005 | Nikolov et al. ............ 385/11 |
| 7,068,887 B1 * | 6/2006 | Gunn et al. ............... 385/37 |

FOREIGN PATENT DOCUMENTS

WO    WO 2006085308 A * 8/2006

OTHER PUBLICATIONS

C. T. Black, et al., "Structural Evoluation of Cylindrical Phase Diblock Copolymer Thin Films" *J. Poly. Sci.*, Part A 42, 1970 (2004).
C. T. Black, et al., "Formation of Nanometer-Scale Dot Arrays From Diblock Copolymer Templates" *Mat. Res. Soc. Symp. Proc.*, 728, S491 (2002).
K. W. Guarini, et al., "Nanoscale Patterning Using Self-Assembled Polymers for Semiconductor Applications" *J. Vac. Sci. Tch. B*, 19(6), pp. 2784-2788; (2001).
T. Sawitowski, et al., "Nanostructuring of Surfaces Using Anodic Alumina Masks, Methods, Materials and Properties" *Nanotech*, vol. 3, pp. 1-4; (2003); and.
Y. T. Tian, et al., "Alumina Nanowire Arrays Standing on A Porous Anodic Alumina Membrane", *Institute of Physics Publishing*, pp. 189-191 (2004).

* cited by examiner

*Primary Examiner*—Tina M Wong
(74) *Attorney, Agent, or Firm*—Scully, Scott, Murphy & Presser, P.C.; Daniel P. Morris, Esq.

(57) ABSTRACT

A method in effectuating the redirection of light which is propagated within a waveguide, and which eliminates the necessity for a bending of the waveguide, or the drawbacks encountered in directional changes in propagated light involving the need for sharp curves of essentially small-sized radii, which would resultingly lead to excessive losses in light. In this connection, the method relates to the fabricating and the provision of a wire-grid polarization beam splitter within an optical waveguide, which utilizes a diblock copolymer template to formulate the wire-grid.

20 Claims, 3 Drawing Sheets

WAVEGUIDE POLARIZATION BEAM SPLITTERS AND METHOD OF FABRICATING A WAVEGUIDE WIRE-GRID POLARIZATION BEAM SPLITTER

BACKGROUND OF THE INVENTION

1. Field of the Invention

The present invention relates to waveguide polarization beam splitters, and particularly, pertains to a wire-grid polarization beam splitter including a planar or ridged waveguide, which is adapted to either transmit or reflect light within the waveguide in dependence upon incident polarization.

Furthermore, the present invention also relates to a novel method of fabricating a waveguide polarization beam splitter, and particularly a wire-grid polarization beam splitter with a planar or a ridge waveguide, which is adapted to be utilized in order to either transmit or reflect light within the waveguide in dependence upon incident polarization.

In essence, a waveguide polarization beam splitter comprises a key element in a photonic integrated circuit, whereby beam splitters of that type can be advantageously employed as directional couplers, as well as being useful as directional modulators and switches when utilized in conjunction with a polarization rotational waveguide element.

Nevertheless, it is conceivable that problems may be encountered in connection with the redirecting of light within a waveguide, for instance, such as at an angle of 90 degrees relative to the direction of initial propagation of the light upon use thereof with a polarization-rotating element, as may be currently known in the technology.

In view of the above-mentioned problem, which is prevalent in the present-state of the technology, various investigations have been conducted and attempts made in addressing the issue of redirecting light in different directions, the latter of which are at sharp angles relative to the original direction of propagation of the light within a waveguide. Ordinarily, this redirecting of the propagated light has been implemented through the utilization of cylindrical waveguides, for example, such as in the form of optical fibers, or through the intermediary of ridged waveguides, which, however, are subject to being burdened with large losses of light, thereby resulting in poor and consequently unsatisfactory degrees of efficiencies when the radii of curvature in redirecting the lights are reduced so as to be extremely small in size. Consequently, these light losses are generally ascribed as being due to so called a micro-bending phenomenon.

2. Discussion of the Prior Art

Heretofore, this particular aspect in the problems of encountered light losses has not been fully addressed in the technology, and any practical attempt in solving this problem in the redirection of the propagated light has ordinarily be in the employment of a directional coupler. However, directional couplers are primarily passive devices and enable only a fraction of the incident light to be redirected, whereby the redirected light is again bounded by relatively large radii of curvatures, which are necessitated due to the limitations resulting from micro-bending losses. Although attempts have been made at switching all of the light successfully into one arm of a directional coupler, such as by means of $LiNbO_3$ and other kinds of electro-optical waveguide elements, the deviation of the light from the original direction thereof is, however, again limited in scope. Furthermore, although various types of wire-grid polarization beam splitters have been developed in the technology, none are designed to be operative within a waveguide and, consequently, are of essentially limited value within the context of the subject matter of the present invention.

SUMMARY OF THE INVENTION

In order to obviate or ameliorate the drawbacks which are encountered in the technology, the present invention is directed to the provision of a novel method in effectuating the redirection of light which is propagated within a waveguide, and which eliminates the necessity for a bending of the waveguide, or the drawbacks encountered in directional changes in propagated light involving the need for sharp curves of essentially small-sized radii, which would resultingly lead to excessive losses in light. In this connection, the present invention is directed to a method of fabricating and in the provision of a wire-grid polarization beam splitter within an optical waveguide, which utilizes a diblock copolymer template.

In essence, the use of diblock copolymers in connection with the forming of templates are known in the technology, having specific reference, for example, to C. T. Black and K. W. Guarini, "Structural Evolution of Cylindrical Phase Diblock Copolymer Thin Films", J. Poly Sci. Part A 42, 1970 (2004); C. T. Black, K. W. Guarini, R. L. Sandstrom, S. Yeung and Y. Zhang, "Formation of Nanometer-Scale Dot Arrays from Diblock Copolymer Templates, Mat. Res. Soc. Symp. Proc. 728, S491 (2002); and K. W. Guarini, C. T. Black, K. R. Milkove and R. L. Sandstrom, "Sub-Lithographic Patterning Using Self-Assembled Polymers for Semiconductor Applications", J. Vac. Sci. Tech. B, 19 2784 (2001).

All of these structures, as disclosed in the above-mentioned literature, are directed to the provision of various templates utilizing diblock copolymer template pore formations in a nanometer scale, preferably, but not limited to such as 50 to 100 nm diameter thin-film template pore formations, and wherein the basic concept thereof is generally known in the technology. However, none of the disclosures, as set forth hereinabove, or in any other prior art publications, are directed to the utilization of such diblock copolymer thin films in conjunction with a method of fabricating a waveguide wire-grid polarization beam splitter.

In connection with the foregoing, diblock copolymers provide a highly desirable variety in the formation of possible nanostructures, such as in being able to implement their size tunability and in their manufacturing process compatibility. In particular, highly acceptable diblock copolymer thin-films employable for the inventive purposes are generally constituted of suitable materials, preferably such as polystyrene (PS) or polymethylmethacrylate (PMMA), although numerous other copolymer materials would also be applicable thereto. The structures and concepts of forming such diblock copolymer thin films are readily and clearly discussed in the above-mentioned literature, which are publications of the International Business Machines Corporation, the assignee of the present application, and the disclosures of which are incorporated herein by reference in their entireties.

In particular, as set forth hereinabove, pursuant to the invention, by means of the novel waveguide wire-grid polarization beam splitter, light can be conducted at an angle of 90 degrees relative to the original direction of propagation thereof to a grid (such as in a TM mode). Thus, when an electrical field vector is perpendicular to the grid (TE mode) the direction of propagation of the light through the waveguide is undisturbed and light continues traveling in its original direction. However, when utilized with a polarization-rotating element, this device would then enable the directional switching of the light as a function of polarization.

Accordingly, it is an object of the invention to provide a novel waveguide wire-grid polarization beam splitter for the transmission or reflection of light and redirection thereof within a waveguide.

Another object of the present invention resides in the provision of an optical waveguide wire-grid polarization beam splitter, wherein the optical waveguide utilizes a diblock copolymer template for the function of the wire-grid.

A further object of the invention resides in the provision of a method of forming a waveguide wire-grid polarization splitter in a waveguide, which utilizes a diblock copolymer template for the fabrication of the wire-grid.

BRIEF DESCRIPTION OF THE DRAWINGS

Reference may now be made to the following detailed description of the invention, illustrative of various embodiments and aspects in connection with the fabrication of a wire-grid polarization beam splitter within an optical waveguide through the use of a diblock copolymer template; and wherein.

DETAILED DESCRIPTION OF THE PREFERRED EMBODIMENTS

Referring in specific detail to the invention, it is noted that, in essence, the structure of the waveguide polarization beam splitter is predicated on the concept that a grid of parallel metallic wires reflect radiation of one polarization while transmitting the other polarization, providing that the wavelength of the light is approximately 10 times larger than the period of the grid, or in the present instance, the metal dot array wire or wires. Through an application of this principle, it is possible to construct such a wire-grid within a waveguide structure by the inventive techniques, as disclosed and elucidated hereinbelow.

Figure 1:
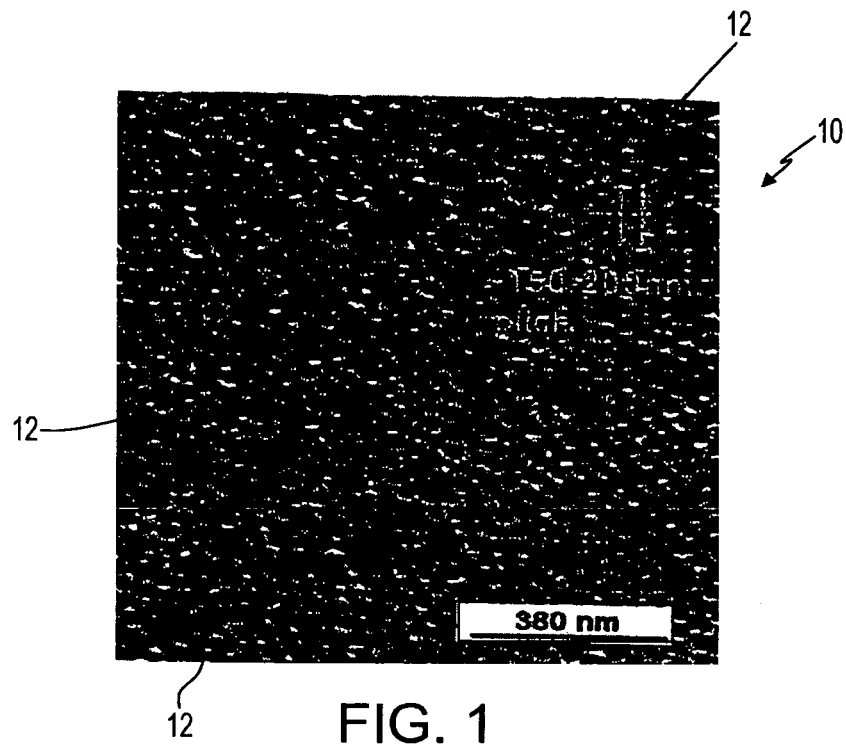
FIG. 1 illustrates a diblock copolymer template pore formation structure possessing 50 to 100 nm sized pores.

As illustrated in FIG. 1 of the drawings, a template 10, which is constituted of a diblock copolymer, possesses a pore formation 12 (in the nanometer scale), which pores are in a generally well-ordered or uniformly hexagonal template array. The template 10 is employable in a waveguide light polarization arrangement or structure, as described hereinbelow and incorporates a pore diameter size range of preferably from about 50-100 nm, and with a pore spacing of preferably from about 150-200 nm, although other pore diameter sizes and spacings are contemplateable within the context and scope of the invention. The diblock copolymer materials may comprise polystyrene (PS) or polymethylmethacrylate (PMMA), although other copolymers and composites thereof may also be suitable in the forming of the waveguide template, as described in the above-mentioned literature.

Figure 2:
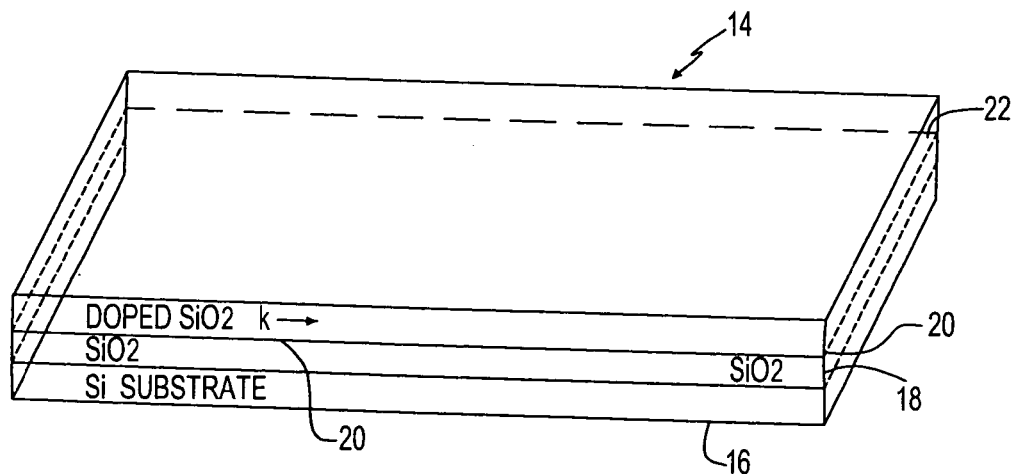
FIG. 2 illustrates a planar or slab type waveguide, which is built up to a guiding film layer, such as doped $SiO_2$.

A waveguide structure 14 of an embodiment, which is of a planar or slab-like shape, as shown in FIG. 2, may be fabricated by standard or known methods of a supportive or base substrate 16, which is constituted of a suitable dielectric material, for example, such as Si. A dielectric waveguide layer 18 possessing an index of refraction (ns) is superimposed on the base layer 16, and could typically be constituted of $SiO_2$. A light guiding film 20 possessing a higher index of refraction (nf) is then deposited on that dielectric layer 18, and could be constituted of SiON. A cover layer or capping layer 22 having a lower index of refraction (nc) can then be deposited on the guiding film 20, and can be constituted of $SiO_2$ or doped $SiO_2$, although other dielectric materials can be employed with the invention.

Figure 3:
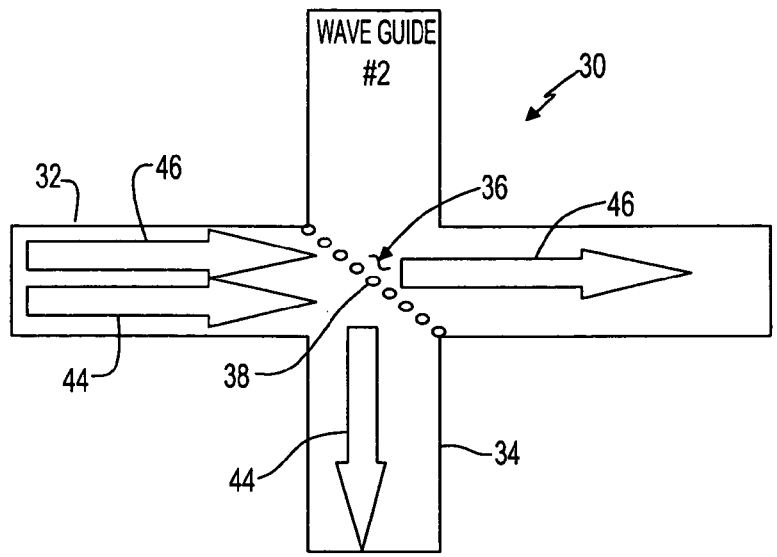
FIG. 3 illustrates a ridged waveguide structure with a wire-grid polarization beam splitter pursuant to the present invention.

In the case of a ridged waveguide 30, as shown in FIG. 3, the structure comprises two intersecting sections 32, 34 of the waveguide 30. At the location of the intersection 36 of these two waveguide sections 32, 34, a mesh-like metal dot array wire 38, each incorporating a pore diameter ranging from about 50 to 100 nm and with spacings therebetween of from about 150 to 200 nm, as shown in FIG. 1, is placed across a diagonal 40 of this intersection 36 to a vertical depth of 1-5 microns extending into the guiding film layer. Light propagating through the one waveguide section 32 will either be transmitted or reflected at an angle of 90 degrees at the locale of this intersection 36, whereby the 90 degree reflection would then allow light to now propagate into the second waveguide section 34, which is perpendicular or at a right angle to the first waveguide section 32. Photons 44 whose electrical field vectors are parallel to these metal dot array wire elements would then be reflected 90 degrees, so as to then propagate or travel at 90 degrees relative to their original direction within the planar waveguide, i.e., the metal dot array wire spacings would totally reflect the incoming beam of light. Photons 46 with an electrical field vector perpendicular to these metal dot array wire elements would continue to propagate in their original direction, which was determined by their initial propagating condition (unaffected by the metal dot array wire). The advantage resides in the fact that the light is now capable of turning sharp corners (for example, 90 degrees) and the metal dot wire array or grid 38 can be incorporated into the monolithic waveguide structure 30. At this time, this novel construction is not readily possible to implement in the technology with the use of conventional directional light couplers or other conventional light polarization beam splitters.

Figure 4:
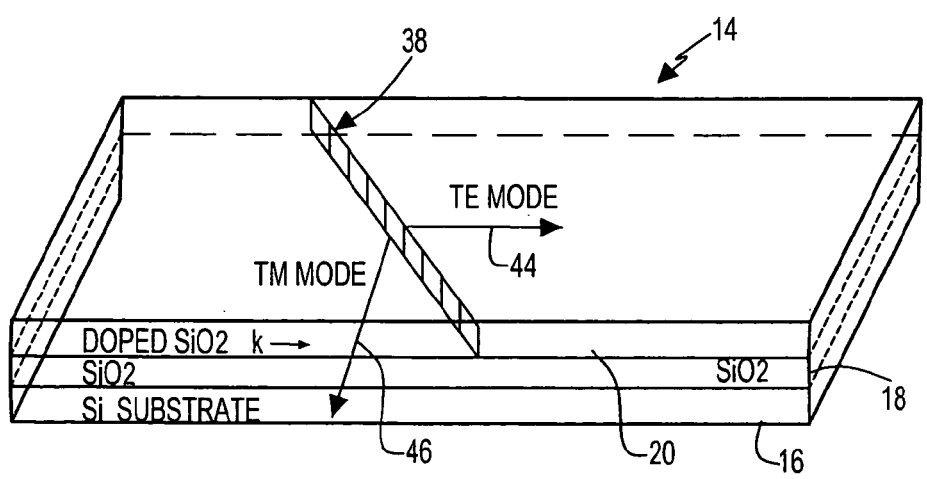
FIG. 4 illustrates a planar or slab waveguide with a wire-grid polarization beam splitter.

In the case of the planar or slab-like waveguide 14, as represented in FIG. 4, the metal dot array wire or grid 38 would be placed at an angle of 45 degrees relative to the direction 44 of the propagated light, as in FIG. 3. The number of spacing widths between these metal dot array wires or elements is designed to be sufficient in order to be able to intercept the entire width of the launched or initially propagated light beam (~1 mm) traveling through the waveguide.

Figure 5:
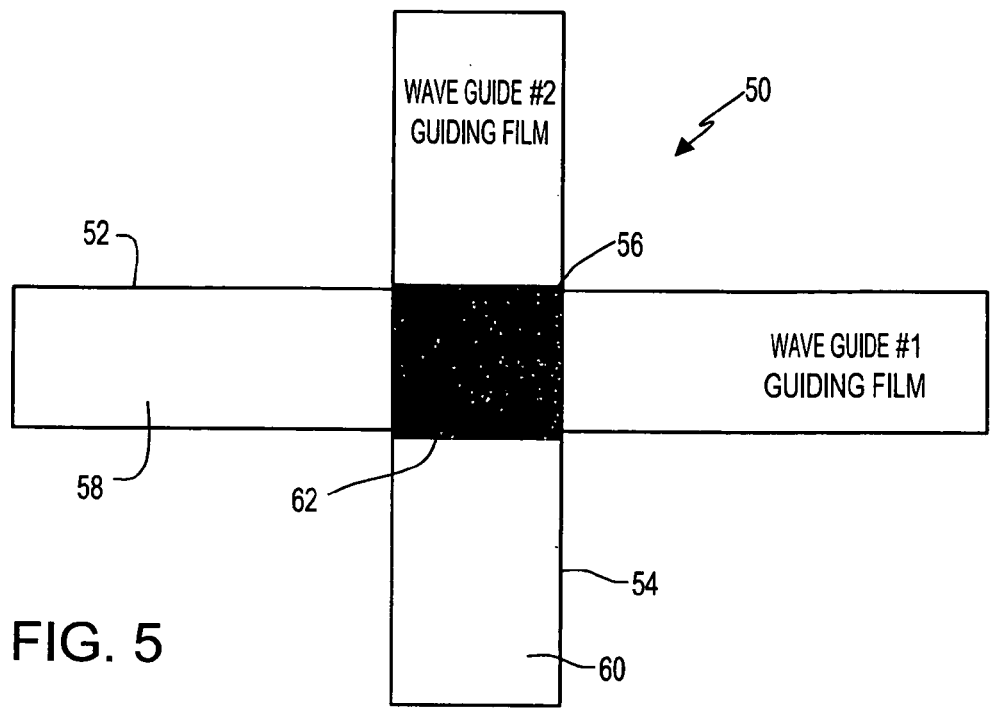
FIG. 5 illustrates a ridged waveguide structure with a spun-on diblock copolymer template.

Reverting to FIG. 5 of the drawings, there is illustrated a ridged waveguide structure 50, comprising a first waveguide 52 and a second waveguide 54 extending at 90 degrees relative thereto, so as to form a configuration similar to that of FIG. 3. However, in this instance, at the intersection 56 between the waveguides 52, 54, the latter of which include a guiding film layer 58, 60, such as, for example, of doped $SiO_2$, although this can also be SiON, there is provided a spun-on diblock copolymer template 62. The template may be of a diblock copolymer material, which possesses a pore size and pore spacing, as described in connection with that of FIG. 1 of the drawings, i.e., such as polystyrene or polymethlmethacrylate, or the like.

Figure 6:
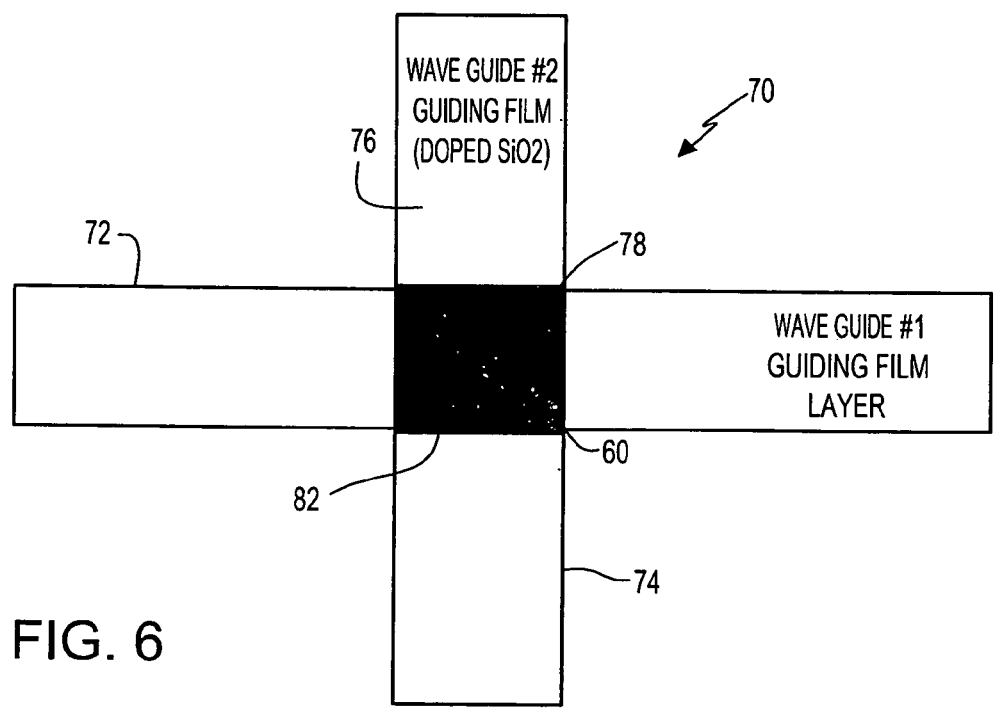
FIG. 6 illustrates a ridged waveguide structure with a masked off diblock copolymer film arrangement.

In the embodiment of FIG. 6, the waveguide structure 70, which has the first and second waveguide sections 72, 74 extending at 90 degrees relative to each other, is built up to the guiding film dielectric layer 76 with a mask 78 leaving a line of 50 to 100 nm pores from the diblock copolymer template 80. This line 80 of template pores is directed at 45 degrees relative to incident light across from the intersection 82 between the waveguide sections 72, 74.

In essence, a method setting forth a unique and advantageous technique for fabricating the waveguide grid (such as a metal dot array wire or wires) light polarization beam splitter entails the following method steps:

1) Depositing the waveguide substrate consisting of a dielectric material having an appropriate thickness, for example, such as about 8 microns in the case of $SiO_2$ onto Si or other similar substrate;
2) Depositing the core or guiding film of an appropriate thickness, such as 2 microns for SiON or doped $SiO_2$;
3) Applying a spin-on random diblock copolymer, as described hereinabove, to prepare the surface for vertically-oriented cylindrical phase template pores, and curing in a vacuum oven, then rinsing in toluene for a monolayer formation of selective random copolymers;
4) Subsequently, applying (as in step 3) a spin-on polystyrene-polymethylmethacyrate (30% PS-70% PMMA) diblock copolymer and curing in a vacuum oven, then optionally exposing the substrate to ultraviolet (UV) light, then removing PMMA from the cylindrical pores in acetic acid and a deionized water rinse to create a porous polystyrene template;
5) Masking off all pores with the exception of a single row of template pores at 45 degrees relative to the direction of light propagation while permitting for a remainder of 75 to 100 nm of polymer on either side of this line of pores;
6) Deep etching trenches (2 microns for SiON core) through the core utilizing a 50 degree line of pores as a template down to a substrate layer, for example $SiO_2$, by utilizing reactive ion etching (RIE);
7) Sputter depositing or atomic layer depositing (ALD) a metal wire, such as Au, Ag, Cu, or the like, into 50 to 100 nm diameter lines of holes;
8) Removing the mask from the line formed of template pores;
9) Removing the remaining diblock copolymer using either oxygen plasma, ozone or solvent (e.g.—1-methyl-2-pyrrolidone (NMP)), or combinations thereof, while permitting the metal wire to remain embedded in the core or guiding film of the waveguide;
10) Removing excess metal down to the surface guiding layer of the waveguide (for example, SiON) using chemical mechanical polishing (CMP), wet etching, or combinations thereof; and
11) Depositing a cover layer of $SiO_2$ or other suitable dielectric material onto the waveguide surface.

Alternatively, subsequent to the dielectric substrate having been deposited, a layer of diblock copolymer of a thickness corresponding to that of the guiding film dimension, for example, 2 microns in the case of SiON, can be deposited and developed into 2 micron deep pores. This process entails use of an electric field to vertically align the diblock copolymer cylindrical pores (see, e.g.—T. Thurn-Albrecht, J. Schotter, G. A. Kastle, N. Emley, M. T. Tuominen, T. P. Russell, T. Shibauchi, L. Krusin-Elbaum, K. Guarini, and C. T. Black, "Ultrahigh Density Nanowire Arrays Grown in Self-Assembled Diblock Copolymer Templates", Science 290, 2126 (2000)). The excess pores can be masked off, as described hereinabove in step 5), and the pores at 50 degrees relative to the direction of propagation can be filled with a metal, in accordance with step 7).

The diblock copolymer is then removed in accordance with steps 8) and 9) and a deposition of the guiding layer of the waveguide (2 microns thickness of SiON, in this instance) is followed by the deposition thereon of the dielectric cover layer.

Other alternative methods in creating the wire-grid arrays may also utilize applying porous anodic alumna to create the template of 50-100 diameter pores. This technique may also incorporate deep trench etching in a manner similar to that described above used in combination with diblock copolymer templates, wherein the anodized aluminum provides a further novel aspect, which may be utilized in conjunction with the present invention.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. A method of fabricating an optical waveguide polarization beam splitter, wherein said beam splitter incorporates a wire-grid array in said waveguide for facilitating the transmission or reflection of light propagated within said waveguide in dependence upon incident polarization of the propagated light:
    a) depositing a dielectric waveguide substrate layer onto a base layer;
    b) applying a light guiding film of a dielectric material onto the exposed surface of said waveguide substrate;
    c) providing a diblock copolymer template having an array of pores formed therethrough;
    d) masking off pores to provide a single line of said template pores;
    e) etching at least one trench downwardly through said guiding film to said waveguide substrate surface;
    f) depositing metal wire material into said line of pores formed in said diblock polymer template material;
    g) stripping said diblock copolymer material while permitting metal wire to remain embedded in said waveguide guiding film;
    h) etching off excess metal wire material down to the exposed surface of said waveguide guiding film; and
    i) depositing a cover layer of a dielectric material onto said waveguide guiding film.

2. A method as claimed in claim 1, wherein said waveguide substrate and cover layer are each constituted of $SiO_2$ or doped $SiO_2$.

3. A method as claimed in claim 1, wherein said waveguide guiding film is constituted of $SiO_2$.

4. A method as claimed in claim 1, wherein said waveguide guiding film possesses a higher index of refraction than the indices of refraction of said waveguide substrate and cover layers.

5. A method as claimed in claim 1, wherein said pores each have a diameter in the range of about 50-100 nm and are spaced from each other in the range of about 150-200 nm.

6. A method as claimed in claim 1, wherein said pores are masked off so as to leave a single row of diblock copolymer template pores extending at an angle relative to the initial direction of light propagation into said waveguide.

7. A method as claimed in claim 6, wherein said angle extends at about 45 degrees across said waveguide.

8. A method as claimed in claim 1, wherein said diblock copolymer is selected from the group of materials consisting of polystyrene and polymethylmethacrylate and composites thereof.

9. A method as claimed in claim 1, wherein said diblock copolymer comprises a spin-on copolymer template provided in said waveguide guiding film.

10. A method as claimed in claim 1, wherein said metal wire is sputter deposited into said line of pores formed in said diblock polymer template material.

11. A method as claimed in claim 1, wherein said metal wire is selected from the group of materials consisting of gold, silver copper, anodized aluminum and alloys of said metals.

12. A method as claimed in claim 3, wherein said waveguide guiding film has a thickness of about 2 microns.

13. A method as claimed in claim 1, wherein said array of pores are formed using a film of porous anodized aluminum.

14. An optical waveguide polarization beam splitter, wherein said beam splitter comprises a wire-grid array in said waveguide so as to facilitate the transmission or reflection of light propagated within said waveguide in dependence upon incident polarization of the propagated light, said wire-grid array comprising a metal dot array formed within said waveguide, said waveguide further comprising a planar, slab-shaped waveguide structure having superimposed layers of a dielectric substrate, a $SiO_2$ layer and a guiding film layer, said metal dot array extending diagonally across and downward in said guiding film layer, whereby photons of light propagated by a photonic integrated circuit having electrical field vectors parallel to the metal dot array are reflected at an angle relative to the initial direction of light with the waveguide while photons with an electrical field vector perpendicular to the metal dot array facilitate light to continue to propagate in the initial direction of transmission thereof.

15. A waveguide polarization beam splitter, as claimed in claim 14, wherein said metal dot array has a strippable diblock copolymer deposited thereon so as to form a pore line having pore diameters within a range of about 50-100 nm at pore spacings within a range of about 150-200 nm.

16. A waveguide polarization beam splitter, as claimed in claim 15, wherein said diblock copolymer is selected from the group of materials consisting of polystyrene, polymethylmethacrylate and composites thereof.

17. A waveguide polarization beam splitter, as claimed in claim 14, wherein said metal dot array forming said wire-grid is selected from the group of materials consisting of anodized aluminum, gold, silver and copper and alloys of said metals.

18. A waveguide polarization beam splitter, as claimed in claim 14, wherein said beam splitter comprises a ridged waveguide structure having intersecting waveguide section extending at 90 degrees relative to each other; a parallel metal wire-grid row with 50-100 nm diameter wire pores and 150-200 nm wire spacing extending diagonal across the intersection of said waveguide sections; and a strippable diblock polymer material covering said metal wire grid pores.

19. A waveguide polarization beam splitter, as claimed in claim 18, wherein said copolymer template is formed bye a spun-on template extending into the guiding film layer of said waveguide structure.

20. A waveguide polarization beam splitter, as claimed in claims 14 or 19, wherein a cover layer of a dielectric material is deposited on the guiding film layer of said waveguide structure.

* * * * *